Sept. 8, 1964  R. F. SARO  3,147,832
MOUNTING MEANS AND TOOL THEREFOR
Filed Dec. 16, 1959

INVENTOR.
RICHARD F. SARO
BY
Hauke & Hardesty
ATTORNEYS

United States Patent Office 3,147,832
Patented Sept. 8, 1964

3,147,832
MOUNTING MEANS AND TOOL THEREFOR
Richard F. Saro, Oak Park, Mich., assignor to Detroit Stud Welding & Mfg. Corp., Oak Park, Mich., a corporation of Michigan
Filed Dec. 16, 1959, Ser. No. 859,878
2 Claims. (Cl. 189—88)

My invention relates to a means for mounting insulating material on fluid ducts, and a tool used in connection therewith.

In the installation of insulating material on ducts, pipes, water tanks and the like, it is generally common practice to weld or otherwise affix nails to the outer surface of the duct with the pointed ends extending outward, wrap or otherwise apply a layer or layers of insulation on the outer surface with the nails protruding through the insulation, and then install clips or retaining elements on the end of the nails to retain the insulation in place.

One difficulty with conventional practice is that these prior constructions do not provide for an adequate vapor barrier, and these nails are not readily painted over. Another problem is that projecting nails, even if the points are clipped off, are a hazard, and they cannot be cut off close to conventional retaining elements due to the likelihood of their slipping off. A further problem is that uniformity of installation is not readily accomplished, and the resulting insulation surface usually will be uneven.

An object of the present invention is to facilitate the mounting of insulation on fluid ducts and the like by providing a simplified mounting clip and means for permanently retaining same on the nails or studs protruding through the insulation.

Another object of the invention is to improve insulation capabilities by providing a means for mounting insulation on a duct or the like to present a smooth surface which can be painted readily.

Another object of the invention is to simplify the installation of insulation by providing a retainer mounted on a nail or the like, the end of which is uniformly cut and swaged by an improved tool.

For a more complete understanding of the invention, reference may be had to the accompanying drawing illustrating a preferred embodiment of the invention in which like reference characters refer to like parts throughout the several views and in which FIG. 1 is a cross section through an installation utilizing the present invention.

Figure 1:
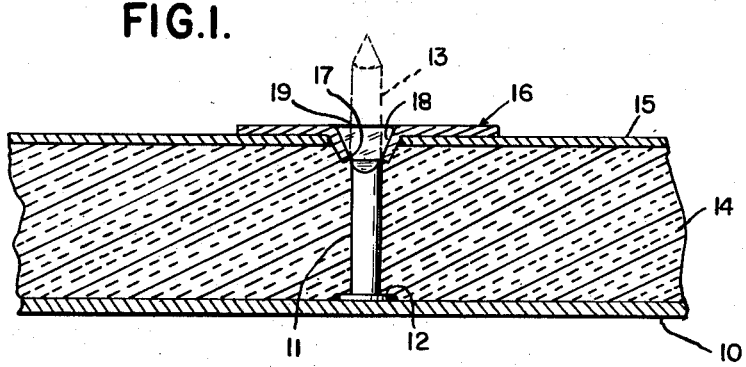
Figure 2:
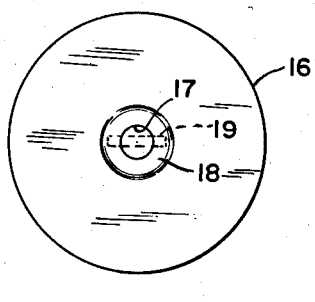
FIG. 2 is a plan view of the retaining disc utilized in the invention.

A portion of a fluid duct 10 or the like is illustrated in FIG. 1 as having a stud or nail 11 welded or otherwise secured by its head 12 to the outer surface of the duct 10 with the pointed end 13 shown partially in phantom lines as extending outwardly from the duct surface 10 through a layer of resilient insulating material 14 or the like preferably covered by a fibrous sheet of vapor barrier material 15.

A retainer disc 16, having a centrally disposed hole 17 the peripheral edge of which is depressed or dished as at 18 to form an inwardly extending recess, is installed over the nail 11 as shown, after which the end 13 of the nail 11 is sheared off and the resulting end portion 19 is swaged or flattened to substantially conform to the disc recess and to be disposed substantially flush with the surface of the disc 16. The disc can subsequently be painted, and the paint will fill the recess and readily cover the flattened end of the nail 11 to reduce condensation.

In practice, uniform length nails 11 are installed, and a special tool 25 is used which depresses the disc 16 against the resilient insulation 14, clips off the nail end 13 to a predetermined length, and swages the resultant nail end 19 as shown, after which the disc 16 is pushed outward by the insulation 14 so that the swaged nail end 19 is pulled into the recess of the disc.

Figure 4:
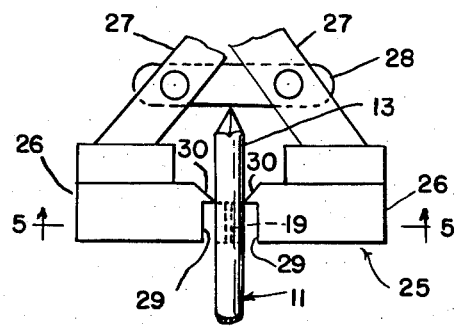
FIG. 4 is a fragmentary elevational view of the preferred tool utilized for the installation.
Figure 3:
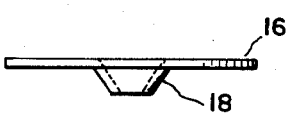
FIG. 3 is a side elevational view of the disc of FIG. 2.
Figure 5:
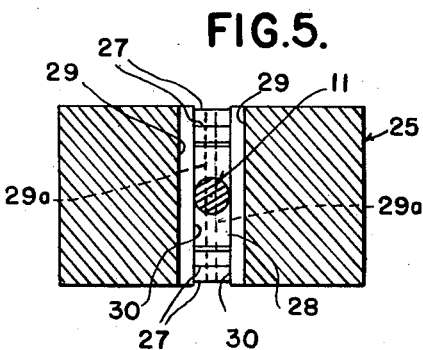
FIG. 5 is a cross sectional view taken substantially on the line 5—5 of FIG. 4.

This tool 25 is illustrated in part in FIGS. 4 and 5 as comprising a pair of jaws 26 mounted on the ends of the actuating arms 27 which carry a stop element 28. Each jaw 26 has a swaging face 29 and a blade or cutter 30 extending therefrom a distance of less than the radius of the nail 11 to be sheared, such that on moving the jaws 26 together, the nail end 13 will be cut off by the cutters 30 and the swaging faces 29 will move inward only to the phantom lines 29a of FIG. 5, swaging or flattening the resultant nail end to the contour indicated by the phantom lines 19 of FIG. 4. The tool 25 is pushed against the disc 16 so that the tip of the nail end 13 abuts the stop element 28 as shown in FIG. 4, thus assuring that every nail 11 will be cut to uniform length, providing for uniform installation throughout.

Although I have described only one embodiment of my invention, it will be apparent to one skilled in the art to which the invention pertains that various changes and modifications may be made therein without departing from the spirit of the invention or the scope of the appended claims.

I claim:
1. A means for mounting a layer of resilient insulating material on the exterior surface of a fluid duct and the like, said means comprising
   (a) a disc positioned on the exterior surface of said insulating material and provided with a central hole,
   (b) the peripheral edge of said hole being depressed inwardly to form a substantially frusto-conical recess portion embedded in said insulating material, whereby said disc is substantially flush with the surface of said insulating material,
   (c) a stud having a flat head portion secured to said duct surface and a pin portion extending outwardly from and substantially normal to said duct surface through said insulating material and through said hole,
   (d) said pin portion being deformed at its end to provide a substantially flat portion disposed within said recess portion and engaged with portions of said disc forming said recess portion to retain said disc on said stud and to provide an end surface thereof substantially flush with the surface of said disc.
2. The means as defined in claim 1 and in which said deformed end of said pin portion has a substantially dove-tailed profile substantially complementary to a diametric cross-sectional of said frusto-conical recess portion.

References Cited in the file of this patent
UNITED STATES PATENTS

| | | |
|---|---|---|
| 1,783,248 | Loucks | Dec. 2, 1930 |
| 2,367,790 | Moore | Jan. 23, 1945 |
| 2,673,390 | Broberg | Mar. 30, 1954 |
| 2,813,278 | Stecher | Nov. 19, 1957 |
| 2,838,773 | Muse | June 17, 1958 |
| 2,910,155 | Bradner | Oct. 27, 1959 |